US012276859B2

(12) United States Patent
Takita et al.

(10) Patent No.: US 12,276,859 B2
(45) Date of Patent: Apr. 15, 2025

(54) LENS BARREL AND IMAGING DEVICE

(71) Applicant: NIKON CORPORATION, Tokyo (JP)

(72) Inventors: Hiroki Takita, Tokyo (JP); Yasuhiko Endo, Tokyo (JP)

(73) Assignee: NIKON CORPORATION, Tokyo (JP)

( * ) Notice: Subject to any disclaimer, the term of this patent is extended or adjusted under 35 U.S.C. 154(b) by 516 days.

(21) Appl. No.: 17/641,307

(22) PCT Filed: Jul. 22, 2020

(86) PCT No.: PCT/JP2020/028439
§ 371 (c)(1),
(2) Date: Mar. 8, 2022

(87) PCT Pub. No.: WO2021/049184
PCT Pub. Date: Mar. 18, 2021

(65) Prior Publication Data
US 2022/0291474 A1 Sep. 15, 2022

(30) Foreign Application Priority Data
Sep. 13, 2019 (JP) .................................. 2019-167202

(51) Int. Cl.
*G02B 9/00* (2006.01)
*G02B 7/04* (2021.01)
(Continued)

(52) U.S. Cl.
CPC ................. *G02B 7/04* (2013.01); *G03B 9/06* (2013.01); *G03B 9/22* (2013.01)

(58) Field of Classification Search
CPC .......... G02B 5/005; G02B 7/04; G02B 7/102; G02B 27/646
(Continued)

(56) References Cited

U.S. PATENT DOCUMENTS

| 8,511,919 | B2 * | 8/2013 | Abe | ...................... G03B 11/00 396/505 |
| 2003/0007802 | A1 * | 1/2003 | Noguchi | .................. G03B 9/10 396/493 |

(Continued)

FOREIGN PATENT DOCUMENTS

| JP | H06-332033 | A | 12/1994 |
| JP | 2000-231049 | A | 8/2000 |

(Continued)

OTHER PUBLICATIONS

Sep. 8, 2020 Search Report issued in International Patent Application No. PCT/JP2020/028439.
(Continued)

*Primary Examiner* — Mahidere S Sahle
(74) *Attorney, Agent, or Firm* — Oliff PLC

(57) ABSTRACT

A lens barrel, that can be made thinner, has a lens holding frame that holds a lens; a driving part that is held by the lens holding frame; aperture blades including a first engaging part and a second engaging part; a first member that engages with the first engaging part and can be rotated around an optical axis by the driving part; and a second member that engages with the second engaging part and is provided with the aperture blade arranged between the second member and the first member.

11 Claims, 6 Drawing Sheets

(51) Int. Cl.
*G02B 9/08* (2006.01)
*G03B 9/06* (2021.01)
*G03B 9/22* (2021.01)

(58) Field of Classification Search
USPC .................................................. 359/738–740
See application file for complete search history.

(56) References Cited

U.S. PATENT DOCUMENTS

| | | | |
|---|---|---|---|
| 2004/0008425 A1* | 1/2004 | Miyawaki ................ | G03B 9/10 |
| | | | 359/738 |
| 2004/0201707 A1 | 10/2004 | Noguchi et al. | |
| 2008/0205880 A1* | 8/2008 | Aoshima ........... | B29C 66/73116 |
| | | | 396/510 |
| 2010/0183288 A1 | 7/2010 | Kudoh | |
| 2010/0220988 A1* | 9/2010 | Ohno ....................... | G03B 9/40 |
| | | | 396/242 |
| 2011/0235001 A1* | 9/2011 | Matsumoto .............. | G02B 7/10 |
| | | | 359/740 |
| 2018/0284572 A1 | 10/2018 | Nagao et al. | |

FOREIGN PATENT DOCUMENTS

| | | |
|---|---|---|
| JP | 2003-084182 A | 3/2003 |
| JP | 2004-233690 A | 8/2004 |
| JP | 2008-191608 A | 8/2008 |
| JP | 2009-175596 A | 8/2009 |
| JP | 2009-231049 A | 10/2009 |
| JP | 2010-164926 A | 7/2010 |
| JP | 2012-037780 A | 2/2012 |
| JP | 2016-114889 A | 6/2016 |
| JP | 2018-173600 A | 11/2018 |
| JP | 2019-053336 A | 4/2019 |
| JP | 2019-056872 A | 4/2019 |
| JP | 2019-071028 A | 5/2019 |

OTHER PUBLICATIONS

Mar. 14, 2023 Office Action issued in Japanese Patent Application No. 2021-545153.
Aug. 1, 2023 Office Action issued in Japanese Patent Application No. 2021-545153.
Jun. 30, 2023 Office Action issued in Chinese Patent Application No. 202080062624.X.

* cited by examiner

LENS BARREL AND IMAGING DEVICE

TECHNICAL FIELD

The present invention relates to a lens barrel and an imaging device.

BACKGROUND ART

Conventionally, there has been a lens barrel including a lens holding frame that holds a lens and an aperture mechanism. Thinner and lighter lens barrels have been awaited.

Patent Document 1: Japanese Unexamined Patent Application, Publication No. H06-332033

DISCLOSURE OF THE INVENTION

The lens barrel of the present invention includes a lens holding frame that holds a lens, a driving part that is held by the lens holding frame, aperture blades including a first engaging part and a second engaging part, a first member that engages the first engaging part and can be rotated around an optical axis by the driving part, and a second member that engages with the second engaging part and is provided with the aperture blade arranged between the second member and the first member.

The imaging device of the present invention includes the lens barrel described above.

PREFERRED MODE FOR CARRYING OUT THE INVENTION (Overall Description)

Figure 1:
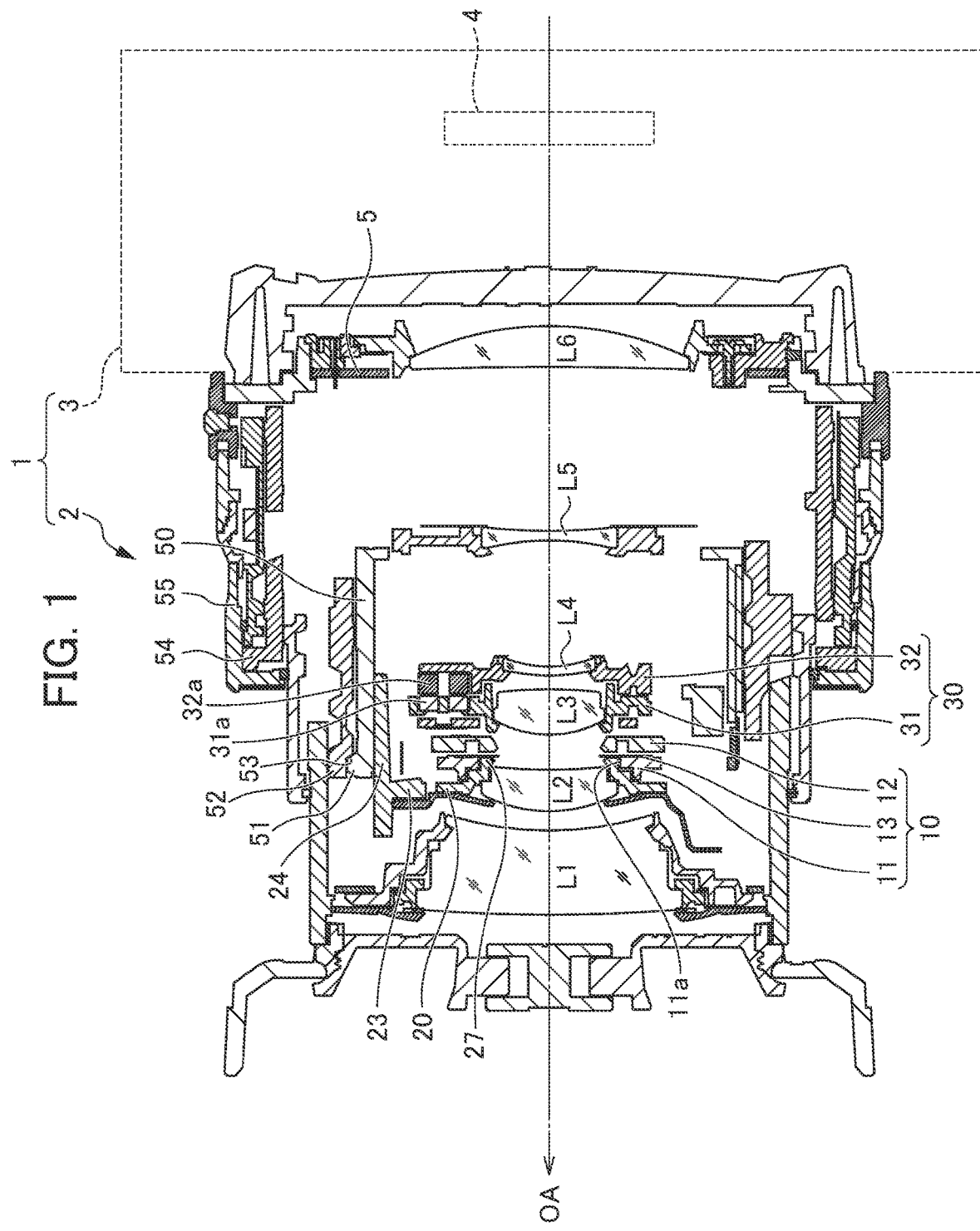
FIG. 1 is a conceptual diagram of an imaging device 1 including a lens barrel 2 of an embodiment mounted on a camera body 3.

FIG. 1 is a conceptual diagram of an imaging device 1 including a lens barrel 2 of an embodiment mounted on a camera body 3. The lens barrel 2 of the embodiment can be attached to and detached from the camera body 3.

The camera body 3 is a so-called digital single-lens reflex camera, which includes an imaging element 4 that converts subject light into an electric signal, processes imaging data generated by the imaging element 4, and records the data on a recording part (not illustrated). The digital single-lens reflex camera may be a mirrorless camera, or may have a mirror. The camera is not limited to a single-lens reflex camera, and may be a so-called compact digital camera or a film camera. The camera may be a two-lens camera. The camera may be a camera built in a smartphone or tablet. The camera may be a camera in which the lens barrel 2 and the camera body 3 are integrated.

The camera body 3 is provided with a plurality of operating parts including a power switch (not illustrated). The ON/OFF signals of the power switch and the signals indicating focusing and aperture values indicated by the operating parts are sent to a control part on a main circuit board 5 in the lens barrel 2, which will be described later, via a contact terminal on the camera body 3 and a contact terminal on the lens barrel 2.

The lens barrel 2 is a so-called zoom lens capable of changing the focal length, and includes, from the front side, a unit-one lens L1, a unit-two lens L2, a unit-three lens L3, a unit-four lens L4, a unit-five lens L5, and a unit-six lens L6. The lens barrel is not limited to a zoom lens, and may be a single-vision lens whose focal length cannot be changed.

The unit-two lens L2, the unit-three lens L3, which is a vibration reducing lens, and the unit-four lens L4, move together in an optical axis OA direction. Aperture blades 13 are arranged between the unit-two lens L2 and the unit-three lens L3.

Figure 2:
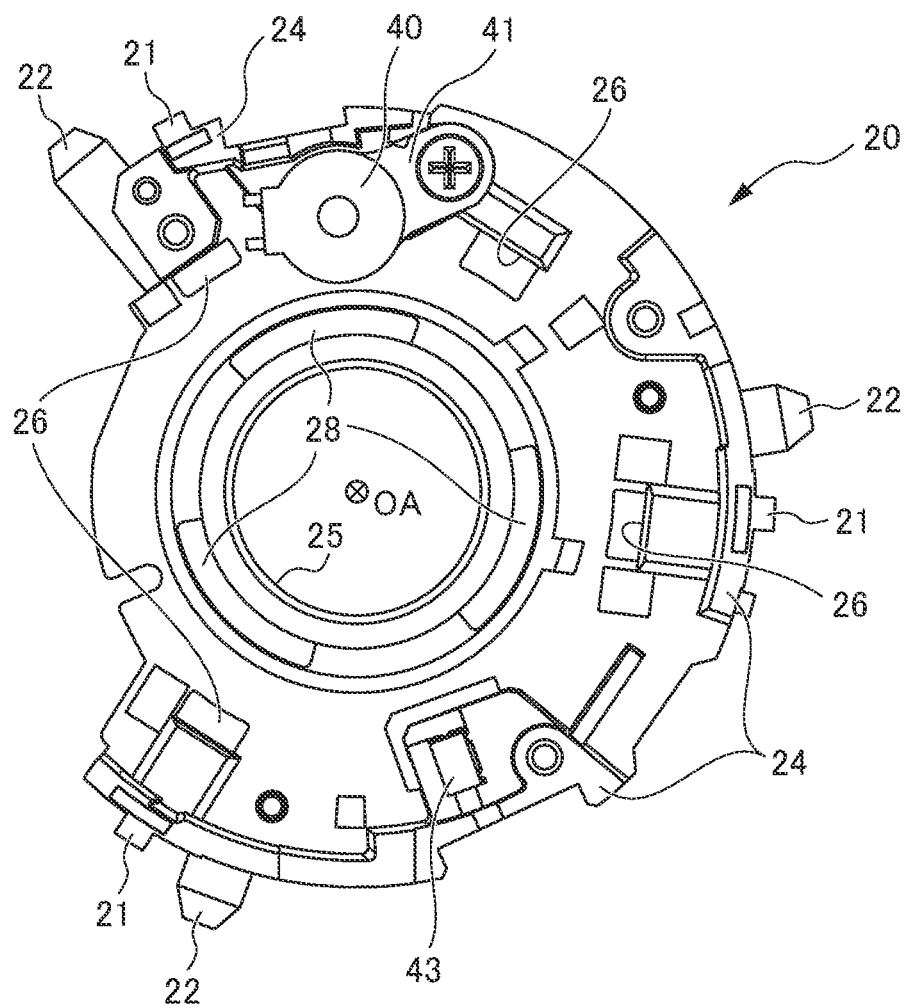
FIG. 2 is a plan view of a unit-two lens holding frame 20 that holds a unit-two lens L2, seen from an image side.

The lens barrel 2 further includes a unit-two lens holding frame 20 that holds the unit-two lens L2. FIG. 2 is a plan view of the unit-two lens holding frame 20 seen from an image side. The outer periphery of the unit-two lens holding frame 20 is provided with three linear-travel keys 21 and three unit-two cam pins 22. The unit-two lens holding frame 20 will be described in detail later.

Returning to FIG. 1, a first tube 50, which is a linear-travel tube, is arranged on the outer peripheral side of the unit-two lens holding frame 20. The first tube 50 holds the unit-five lens L5 at an end on the image side. The inner surface of the first tube 50 is provided with liner grooves (not illustrated) with which the linear-travel keys 21 of the unit-two lens holding frame 20 engage. The outer surface thereof is provided with unit-five cam pins 51.

A second tube 52, which is a cam tube, is arranged on the outer peripheral side of the first tube 50. The inner periphery of the second tube 52 is provided with first tube driving cam grooves 53 with which the unit-five cam pins 51 of the first tube 50 engage, and unit-two driving cam grooves (not illustrated) with which the unit-two cam pins 22 of the unit-two lens holding frame 20 engage.

A rotating tube 54 is arranged on the outer peripheral side of the second tube 52. A zoom ring 55 is arranged on the outer peripheral side of the rotating tube 54. The rotating tube 54 is screwed to the zoom ring 55, and when the zoom ring 55 is rotated, the rotating tube 5 is also rotated. The rotation of the rotating tube 54 causes the second tube 52 to travel linearly while rotating. When the second tube 52 rotates, the first tube 50 moves linearly in the optical axis OA direction.

Since the unit-two cam pins 22 are engaged with the unit-two driving cam grooves of the second tube 52, the unit-two lens holding frame 20 is moved in the optical axis OA direction by the rotation of the second tube 52. At this time, the unit-two lens holding frame 20 is guided to travel linearly in the optical axis OA direction by the movement of the linear-travel keys 21 along the liner grooves of the first tube 50.

Figure 3:
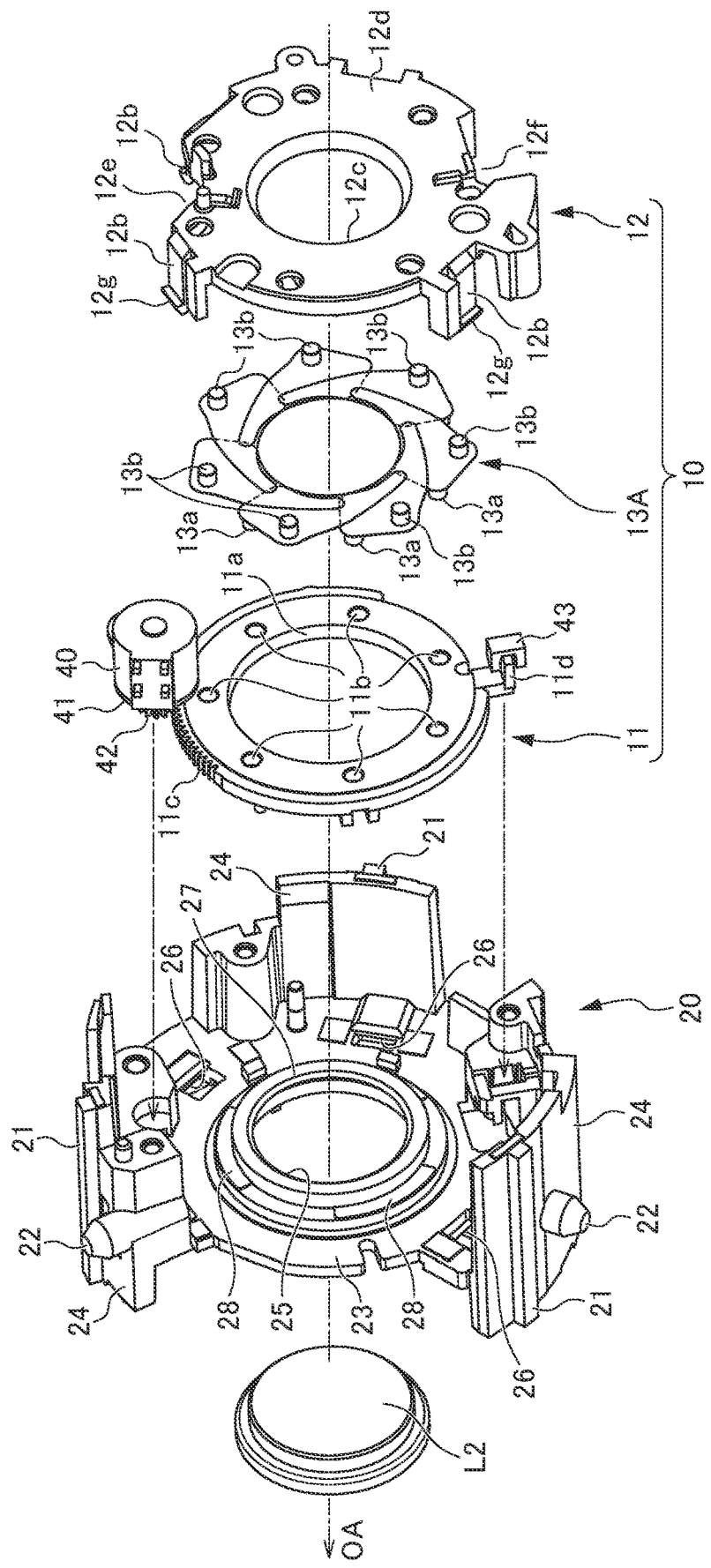
FIG. 3 is an exploded perspective view of the unit-two lens L2, the unit-two lens holding frame 20, and an aperture mechanism 10, seen from an oblique image side.
Figure 4:
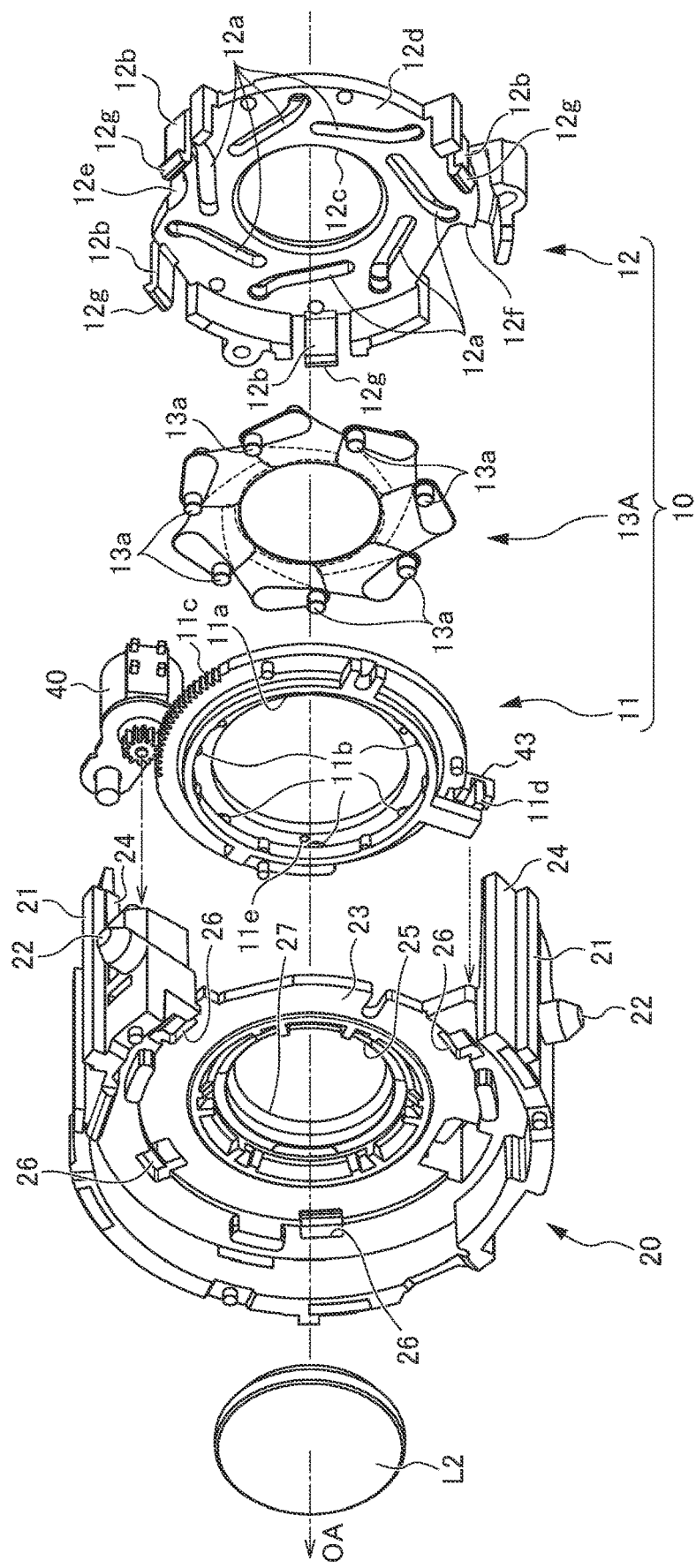
FIG. 4 is an exploded perspective view of the unit-two lens L2, the unit-two lens holding frame 20, and the aperture mechanism 10, seen from an oblique subject side.

FIG. 3 is an exploded perspective view of the unit-two lens L2, the unit-two lens holding frame 20, and an aperture mechanism 10, seen from an oblique image side. FIG. 4 is an exploded perspective view of the unit-two lens L2, the unit-two lens holding frame 20, and the aperture mechanism 10, seen from an oblique subject side. The aperture mechanism 10 arranged on the image side of the unit-two lens holding frame 20 includes, from the subject side, a first member 11, an aperture blade assembly 13A consisting of a plurality of aperture blades 13, and a second member 12.

(Unit-Two Lens Holding Frame 20)

The unit-two lens holding frame 20 includes a disk 23 orthogonal to an optical axis OA and walls 24 that partially cover the outer periphery of the disk 23 and extend in the optical axis OA direction.

The above-described linear-travel key 21 is a protrusion provided on the outer periphery of the wall 24 and extending in the optical axis OA direction. The unit-two cam pin 22 is a projection provided on the outer periphery of the wall 24 and extending in a radial direction around the optical axis OA. Three linear-travel keys 21 and three unit-two cam pins 22 are provided.

The disk 23 is provided with a lens holding opening 25 that holds the unit-two lens L2, in a circular shape around the optical axis OA. As illustrated in FIG. 3, the lens holding opening 25 is surrounded by a protrusion 27 that protrudes slightly more toward the image side than the disk 23. The protrusion 27 is inserted into a circular opening 11a of the first member 11 to position the first member 11 in a radial direction.

Contact surfaces 28 are provided on the image side surface of the outer periphery of the protrusion 27. The contact surface 28 is an arc-shaped flat surface provided in three locations along the circumference centered on the optical axis OA. The contact surface 28 abuts against a projection 11e (illustrated in FIG. 4) on the first member 11.

Further, four claw engaging holes 26 adapted to engage with claws 12g of the second member 12 described below and form part of snap-fit structures are provided radially outward of the contact surface 28 on the disk 23 at substantially the same circumference centered on the optical axis OA.

As illustrated in FIG. 2 (mounted state) and FIGS. 3 and 4 (dismounted state), the lens barrel 2 further includes a driving part 40 mounted on the image side of the unit-two lens holding frame 20 via a mounting plate 41. In FIGS. 3 and 4, the mounting direction is indicated by arrows in the drawings. The driving shaft of the driving part 40 extends to the subject side, and is provided with a gear 42 at the leading end thereof. The driving part 40 in the embodiment is a stepping motor. The driving part 40 is mounted to and held by the unit-two lens holding frame 20.

Similarly, as illustrated in FIG. 2 (mounted state) and FIGS. 3 and 4 (dismounted state), the lens barrel 2 further includes a detecting part 43 on the image side of the unit-two lens holding frame. In FIGS. 3 and 4, the mounting direction is indicated by arrows in the drawings. The detecting part 43 in the embodiment is a photo interrupter. The detecting part 43 is mounted to and held by the unit-two lens holding frame 20.

As illustrated in FIG. 2, the detecting part 43 and the driving part 40 are arranged at positions opposite to each other across the optical axis OA, i.e., at positions approximately 180 degrees apart with the optical axis OA at the center.

(First Member 11)

As illustrated in FIGS. 3 and 4, the first member 11 is substantially disk-shaped and is provided with the circular opening 11a centered on the optical axis OA. In the assembled state illustrated in FIG. 1, the protrusion 27 is inserted inside the circular opening 11a, and the first member 11 overlaps the unit-two lens L2 in a radial direction around the optical axis OA.

The first member 11 is provided with a plurality of circular fitting holes 11b with which first engaging parts 13a of the aperture blades 13 engage. In the embodiment, seven fitting holes 11b are provided on the circumference centered on the optical axis OA at equal intervals, corresponding to the number of the aperture blades 13.

A portion of the outer peripheral edge of the first member 11 has gear teeth 11c that engage with the gear 42 of the driving part 40. When the driving part 40 rotates, the gear 42 driven by the driving part 40 rotates, and the gear teeth 11c that engage with the gear 42 rotate, causing the first member 11 to rotate around the optical axis OA.

A detected part 11d (PI cutter) adapted to pass through the detecting part 43 is provided on substantially the opposite side of the optical axis OA from the part with the gear teeth 11c provided on the outer periphery of the first member 11. The part where the gear teeth 11c are provided and the part where the detected part is provided are arranged at positions substantially opposite to each other across the optical axis OA, corresponding to the driving part 40 and the detecting part 43.

The surface of the first member 11 on the subject side is provided with three projections 11e (FIG. 4 illustrates only one projection 11e) that contact the contact surfaces 28 on the unit-two lens holding frame 20 described above. The projections 11e are provided at positions around the circular opening 11a, corresponding to the contact surfaces 28. When the first member 11 rotates with respect to the unit-two lens holding frame 20 around the optical axis OA, the projections 11e contact the contact surfaces 28 and slide on the contact surfaces 28.

(Aperture Blade 13)

Figure 5:
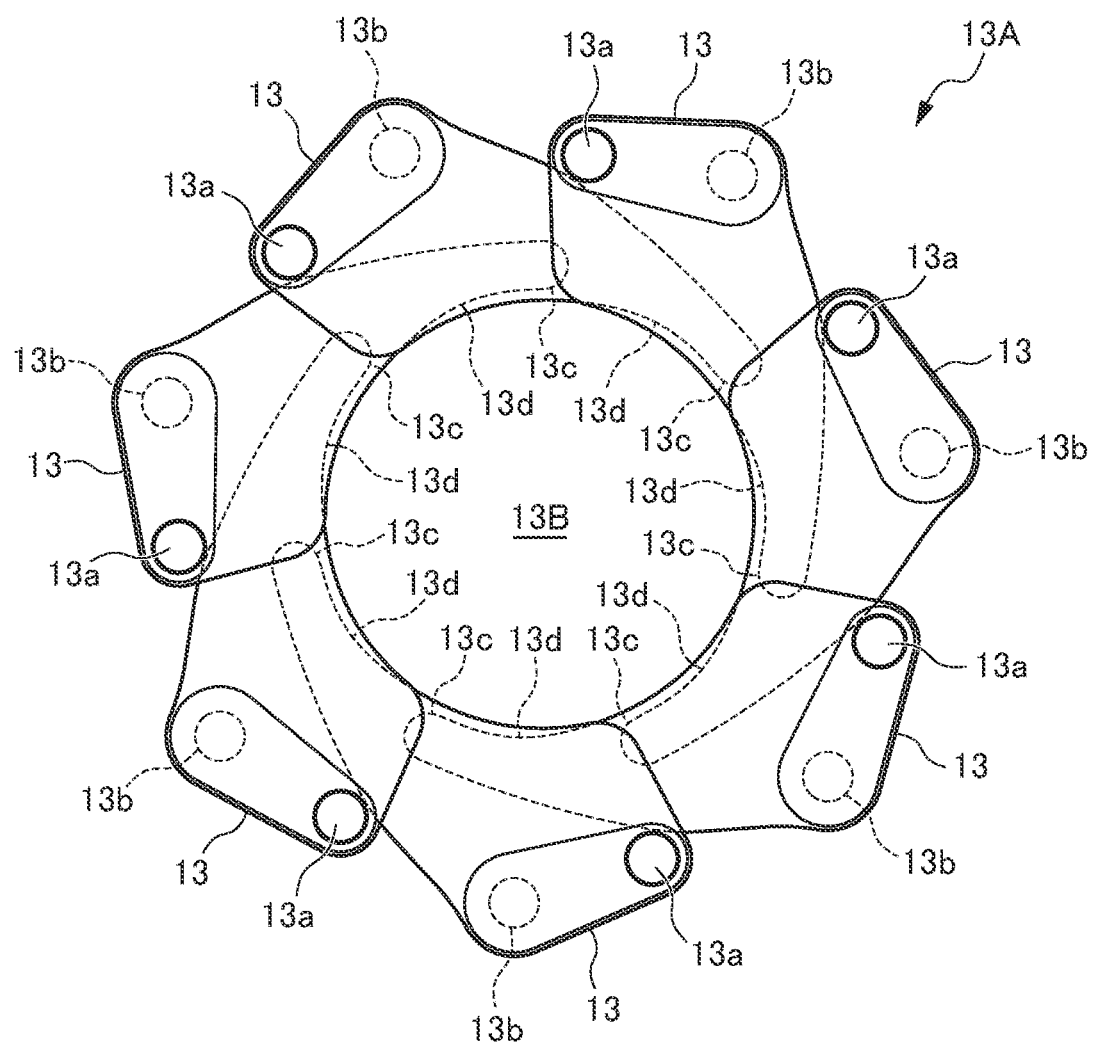
FIG. 5 is a plan view of an aperture blade assembly 13A seen from a subject side.

FIG. 5 is a plan view of the aperture blade assembly 13A seen from the subject side. The aperture blade assembly 13A consists of a plurality of aperture blades 13, which are seven blades in the embodiment, and the combination of the plurality of aperture blades 13 forms an aperture opening 13B.

Each of the aperture blades has a substantially quadrangular shape, and the two sides sandwiching one corner (tip 13c) are longer than the other two sides. One longer side 13d of the two longer sides forms the aperture opening 13B, and is curved to form the circular aperture 13B.

In FIG. 5, the corner (tip 13c) between the two longer sides extends in a clockwise direction, and the tip 13c of one aperture blade 13 is arranged on the image side surface of the adjacent aperture blade 13 in the clockwise direction, i.e., on the opposite side of the unit-two lens holding frame 20, so that the tip 13c cannot be seen from the subject side.

The surface of each aperture blade 13 on the subject side is provided with the first engaging part 13a that is inserted into the fitting hole 11b of the first member 11. The surface of each aperture blade 13 on the image side is provided with a second engaging part 13b that is inserted into a cam groove of the second member 12, which will be described next.

(Second Member 12)

Returning to FIGS. 3 and 4, the second member 12 is provided with the aperture blades 13 arranged between the second member 12 and the first member 11.

The second member 12 includes a disk 12d having a substantially disk shape and provided with a circular opening 12c around the optical axis OA, and four arms 12b extending from the outer periphery of the disk 12d to the subject side in the optical axis OA direction. The leading end of the arm 12b has a claw 12g that protrudes outward in a radial direction.

The arm 12b and the claw 12g constitute a snap-fit structure together with the above-described claw engaging hole 26 in the unit-two lens holding frame 20. The arm 12b is elastically deformable, and the elastic deformability of the arm 12b allows the claw 12g to move in the radial direction. As the second member 12 is moved closer to the unit-two lens holding frame 20, the claw 12g is inserted into the claw engaging hole 26 of the unit-two lens holding frame 20. While the claw 12g passes through the claw engaging hole 26, the arm 12b elastically deforms and the claw 12g moves inward in the radial direction. When the claw 12g has passed through the claw engaging hole 26, the elastic deformation of the arm 12b returns and the claw 12g is caught on the edge of the claw engaging hole 26, and thereby the second member 12 is fixed to the unit-two lens holding frame 20.

As illustrated in FIG. 4, the subject side surface of the second member 12 is provided with a plurality of cam grooves 12a into which the second engaging parts 13b of the aperture blades 13 are inserted.

In the present embodiment, the first member 11 includes the circular fitting holes 11b, and the second member 12 includes the cam grooves 12a, but the present invention is not limited thereto. The first member 11 may include cam grooves, and the second member 12 may include circular fitting holes.

The side surface of the second member 12 has recesses (cutouts) 12e and 12f to allow the driving part 40 and the detecting part 43 to escape. The recesses 12e and 12f are provided to avoid the position of the cam grooves 12a. (FPC)

Figure 6:
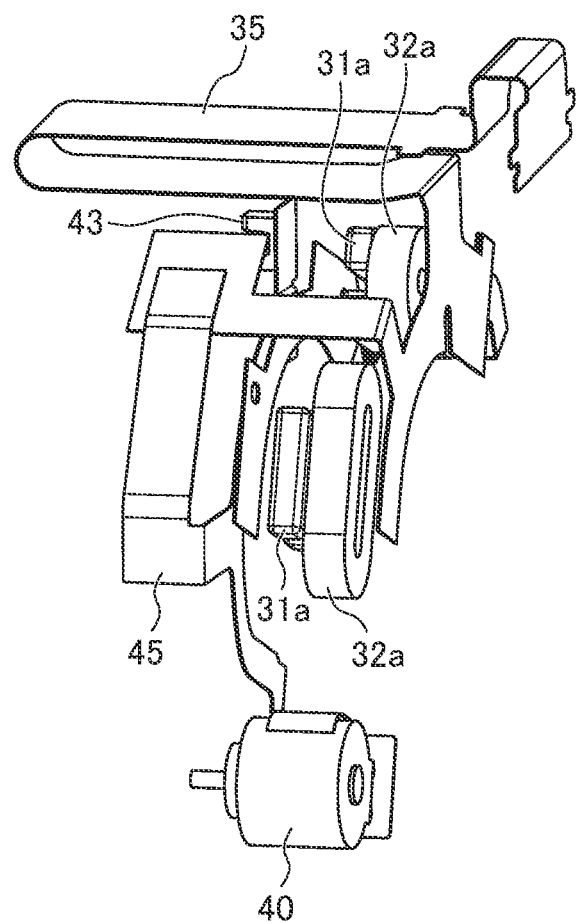
FIG. 6 is a perspective view of an aperture drive flexible printed circuit (FPC) 45 that supplies power to a detecting part 43 and a driving part 40, and a vibration reducing part drive FPC 35.

As illustrated in FIG. 1, a vibration reducing part 30 is arranged on the image side of the second member 12 so as to face the second member 12. FIG. 6 is a perspective view of an aperture drive flexible printed circuit (FPC) 45 that supplies power to the detecting part 43 and the driving part 40, and a vibration reducing part drive FPC 35.

The vibration reducing part 30 includes a movable part 31 that holds the unit-three lens L3, which is a vibration reducing lens, and a fixed part 32 screwed to the unit-two lens holding frame. Coils 32a are attached to the fixed part 32, and magnets 31a are attached to the movable part 31. By supplying predetermined power to the coils 32a, the movable part 31 moves in a plane orthogonal to the optical axis OA with respect to the fixed part 32 by electromagnetic force.

The unit-two lens holding frame 20, to which the driving part 40 and the detecting part 43 are mounted, and the vibration reducing part 30 move together in the optical axis OA direction, so the distance therebetween is constant. Thus, it is easy to connect the aperture drive FPC 45 to the vibration reducing part FPC 35.

Therefore, as illustrated in FIG. 6, the aperture drive FPC 45 connected to the driving part 40 and the detecting part 43 is connected to the vibration reducing part drive FPC 35 connected to the coils 32a. A single FPC extends to the main circuit board 5 illustrated in FIG. 1, in which the control part that controls the vibration reducing part 30 and the driving part 40 is fixed.

Effects of Embodiments (1) As Comparative Example 1, when a base member, which is a separate member, is used as a member to mount the driving part 40 and the detecting part 43 instead of the unit-two lens holding frame 20 in the aperture mechanism, the lens barrel 2 of Comparative Example 1 becomes longer and heavier by the amount of the base member compared to the embodiment.

In contrast, since the embodiment directly mounts the driving part 40 and the detecting part 43 to the unit-two lens holding frame 20 without using the base member, the lens barrel 2 of the embodiment can be made thinner and lighter by the amount of the base member compared to Comparative Example 1.

(2) The second member 12 and the unit-two lens holding frame 20 are snap-fitted with the first member 11 and the aperture blades 13 sandwiched therebetween. This allows the aperture mechanism 10 to move in the optical axis OA direction integrally with the unit-two lens L2.

The second member 12 is fixed to the unit-two lens holding frame 20 by a snap-fit structure without using screws or the like, thereby reducing costs and enabling automatic assembly for easy manufacturing.

It should be noted that the aperture blades 13 and the first member 11 are arranged in the gap between the second member 12 and the unit-two lens holding frame 20 with a slight margin of space in the optical axis OA direction. If the amount of overlap between each of the aperture blades 13 changes when the diameter of the aperture opening is changed, the thickness of the aperture blade assembly 13A may change. Even in such a case, the drive of the aperture blades 13 is not hindered because the margin is provided.

(3) Along the optical axis OA direction, from the subject side, the unit-two lens holding frame 20, the first member 11, the aperture blades 13, and the second member 12 are arranged in this sequence. Thus, when seen from the subject side, the aperture blades 13 are located behind the unit-two lens L2, making it difficult for the aperture blades 13 to be seen from the leading end of the lens barrel 2, so that the appearance is excellent.

(4) The first tube 50 arranged on the outer periphery side of the unit-two lens holding frame 20 and including the liner grooves and the second tube 52 arranged on the outer periphery side of the unit-two lens holding frame 20 and including the unit-two driving cam grooves are included. The unit-two lens holding frame 20 is movable in the optical axis direction by the liner grooves and the unit-two driving cam grooves. Thus, the unit-two lens holding frame 20 is movable in the optical axis OA direction, and the aperture mechanism 10 fixed to the unit-two lens holding frame 20 is also movable in the optical axis OA direction.

(5) When the power of the camera body 3 is turned on, the driving part 40 rotates according to an instruction via the control part. When the first member 11 driven by the driving part 40 rotates, the detected part 11d passes through the detecting part 43, which allows the origin position of the aperture blades 13 to be detected.

The driving part 40 rotates by a predetermined pulse from the origin position, which rotates the first member 11, and thus the positions of the first engaging parts 13a of the aperture blades 13 that are fitted to the fitting holes 11b of the first member 11 change. This allows the aperture opening 13B formed by the plurality of aperture blades 13 to be set to the aperture value set by the photographer.

(6) The detecting part 43 and the driving part 40 are arranged at positions opposite to each other across the optical axis OA, i.e., at positions approximately 180 degrees apart with the optical axis OA at the center.

In terms of space efficiency and ease of wiring, it is preferable that the number of FPCs extending inside the lens barrel 2 is not so large. For this reason, the wiring that supplies power to the driving part 40 and the wiring that transmits detection signals of the detecting part 43 are arranged on a single FPC from the main circuit board 5 to the middle.

The FPC extending from the main circuit board 5 is branched in two directions on the unit-two lens holding frame 20 to the driving part 40 and the detecting part 43, and then connected to the driving part 40 and the detecting part 43.

Here, the drive current sent to the driving part 40 is larger than the detection current sent to the detecting part 43. Thus, if the branching position of the FPC is close to the detecting part 43, noise is likely to be added to the detection signal of the detecting part 43 and may interfere with the detection accuracy of the detecting part 43.

According to the embodiment, the detecting part 43 and the driving part 40 are arranged at positions opposite to each other across the optical axis OA, so that the branching position can be separated from the detecting part 43. Therefore, the effect of noise can be reduced.

(7) Since the lens barrel 2 of the embodiment does not include a base member, the unit-two lens holding frame 20 is provided with the protrusion 27 to hold the unit-two lens L2. The protrusion 27 can be inserted into the circular opening 11a of the first member 11 provided with the fitting holes 11b in the aperture mechanism 10.

Thus, the first member 11 can overlap the unit-two lens L2 in the radial direction around the optical axis OA. In other words, the first member 11 can be arranged in the same radial direction as the unit-two lens L2 held by the unit-two lens holding frame 20 (radially outward of the unit-two lens). This enables the lens barrel 2 to be even thinner.

(8) When the first member 11 rotates with respect to the unit-two lens holding frame 20 around the optical axis OA, the projections 11e of the first member 11 contact the contact surfaces 28, and the projections 11e slide on the contact surfaces 28. In other words, since the first member 11 does not make surface contact with the image side surface of the unit-two lens holding frame 20, the contact area is small, and thus the first member 11 can rotate smoothly without being hindered from rotation. In addition, since the contact surfaces 28 are provided on part of the outer periphery, it is easier to ensure accuracy (flatness) than when the contact surfaces 28 are provided on the entire outer periphery.

(9) The aperture drive FPC 45 connected to the driving part 40 and the detecting part 43 is connected to the vibration reducing part drive FPC 35 connected to the coils 32a. A single FPC extends to the main circuit board 5 in which the control part that controls the vibration reducing part 30 and the driving part 40 is fixed.

Thus, the FPC extending to the main circuit board 5 can be shared, resulting in better space efficiency and cost reduction.

(10) When the aperture blades 13 are throttled, the tips 13c of the aperture blades 13 protrude slightly in the optical axis OA direction. In the embodiment, the tips 13c are arranged on the opposite side of the unit-two lens L2, so the protrusion direction is toward the image side. In contrast, as Comparative Example 2, if the aperture blades 13 overlap so that the tips 13c are arranged on the unit-two lens L2 side, the protrusion direction of the tips 13c is toward the unit-two lens side.

For example, as illustrated in Comparative Example 1 described above, when a base member separates from the unit-two lens holding frame 20 is used as a member to mount the driving part 40 and the detecting part 43, the distance between the aperture blade assembly 13A and the unit-two lens L2 is defined as X1.

On the other hand, in the embodiment in which the base member is not used, the distance between the aperture blade assembly 13A and the unit-two lens L2 is defined as X2. Then, X2 is shorter than X1 by the amount of the base member which is not included.

In this regard, when the protrusion direction of the tips 13c is toward the unit-two lens L2 side as in Comparative Example 2, if the distance X2 between the aperture blade assembly 13A and the unit-two lens L2 is short, the tips 13c are more likely to contact the unit-two lens L2. In contrast, in the case of the embodiment, the protrusion direction of the tips 13c is toward the image side, which is the opposite side of the unit-two lens side, so the tips 13c do not contact the unit-two lens L2.

In addition, the tips 13c are arranged on the opposite side of the unit-two lens holding frame 20 so that they are not visible from the subject side and thus the appearance is good.

Although the embodiments have been described above, the present invention is not limited thereto, and any combination thereof may be used.

EXPLANATION OF REFERENCE NUMERALS

1: imaging device, 2: lens barrel, 3: camera body, 4: imaging element, 5: main circuit board, 10: aperture mechanism 11: first member, 11a: circular opening, 11b: fitting hole, 11d: detected part, 11e: projection, 12: second member, 12a: cam groove, 12b: arm, 12c: circular opening, 12d: disk, 12g: claw, 13: aperture blade, 13A: aperture blade assembly, 13a: first engaging part, 13b: second engaging part, 20: unit-two lens holding frame, 21: linear-travel key, 25: lens holding opening, 26: claw engaging hole, 27: protrusion, 28: contact surface, 30: vibration reducing part, 40: driving part, 43: detecting part, 49: driving part, 50: first tube, 52: second tube, 54: rotating tube

The invention claimed is:

1. A lens barrel, comprising:
   a lens holding frame that holds a lens;
   aperture blades, at least one of which comprises a first projection and a second projection;
   a driving part that is held by the lens holding frame and is configured to change a diameter of an opening formed by the aperture blades;
   a first member that engages with the first projection and can be rotated around an optical axis by the driving part; and
   a second member that engages with the second projection, wherein:
   the aperture blades are arranged between the first member and the second member;
   the lens holding frame comprises a disk that holds the lens and that is orthogonal to the optical axis;
   the first member comprises a third projection that faces the disk and that projects in an optical axis direction; and
   the first member is rotatable while the third projection is in contact with the disk.

2. The lens barrel according to claim 1,
   wherein the second member is fixed to the lens holding frame.

3. The lens barrel according to claim 2,
   wherein the second member is fixed to the lens holding frame by a snap-fit structure.

4. The lens barrel according to claim 1,
wherein the lens holding frame, the first member, the aperture blades, and the second member are arranged in this sequence from a subject side, along the optical axis direction.

5. The lens barrel according to claim 1, further comprising:
a first tube that is arranged on an outer peripheral side of the lens holding frame and has a liner groove; and
a second tube that is arranged on the outer peripheral side of the lens holding frame and has a cam groove,
wherein the lens holding frame is movable in the optical axis direction by way of the liner groove and the cam groove.

6. The lens barrel according to claim 1, further comprising:
a detecting part that is held by the lens holding frame,
wherein the first member comprises a detected part that is detected by the detecting part.

7. The lens barrel according to claim 6,
wherein the lens is arranged between the detecting part and the driving part in a plane orthogonal to the optical axis.

8. The lens barrel according to claim 1, wherein
the first member overlaps the lens in a radial direction centered on the optical axis.

9. The lens barrel according to claim 1, further comprising:
a vibration reducing part that is arranged to face the second member;
a control part that controls the vibration reducing part and the driving part;
a main circuit board to which the control part is fixed; and
a flexible circuit board that connects the main circuit board, the vibration reducing part, and the driving part.

10. The lens barrel according to claim 1,
wherein a plurality of the aperture blades are arranged to overlap so as to protrude to an opposite side of the lens holding frame when an opening formed by the plurality of the aperture blades is the smallest.

11. An imaging device, comprising:
the lens barrel according to claim 1; and
an imaging element.

* * * * *